United States Patent [19]

Rao et al.

[11] Patent Number: 4,713,304

[45] Date of Patent: Dec. 15, 1987

[54] METHOD OF PREPARING LEAD-ACID BATTERY PLATES AND LEAD-ACID BATTERIES CONTAINING PLATES SO PREPARED

[75] Inventors: Purushothama Rao, Eagan; Frederick L. Marsh, Fridley, both of Minn.

[73] Assignee: GNB Incorporated, Mendota Heights, Minn.

[21] Appl. No.: 875,800

[22] Filed: Jun. 18, 1986

[51] Int. Cl.$^4$ ............................................. H01M 4/23
[52] U.S. Cl. .................................... 429/136; 204/2.1; 429/225
[58] Field of Search .................. 204/2.1; 429/225, 136

[56] References Cited

U.S. PATENT DOCUMENTS

| | | | |
|---|---|---|---|
| 1,622,304 | 3/1927 | Angell | 204/2.1 |
| 1,670,046 | 5/1928 | Plews | 204/2.1 |
| 4,271,586 | 6/1981 | McCartney | 29/623.5 |
| 4,338,163 | 7/1982 | Rittenhouse | 204/2.1 |
| 4,429,442 | 2/1984 | Thomas | 29/2 |

OTHER PUBLICATIONS

N. E. Hehner, "Curing of Freshly Pasted Plates", Storage Battery Manufacturing Manual (IBMA, Inc., Largo, Fla., (1970)).
S. C. Barnes, M. E. D. Humphreys, and R. Taylor, "The Curing of Lead-Acid Battery Plates", (Int'l. Power Source Symp., Brighton, England, (1968), reprinted by Pergamon Press Ltd.).
G. W. Vinal, Storage Batteries, (John Wiley & Sons, 4th Ed., 1955), pp. 30–46.

Primary Examiner—Donald L. Walton
Attorney, Agent, or Firm—Augustus J. Hipp; John Kilyk, Jr.

[57] ABSTRACT

A method for preparing lead-acid battery positive and negative plates for use in lead-acid batteries, comprising (a) providing battery grids, (b) applying wet leady oxide paste to the grids to form plates, (c) optionally wrapping the freshly pasted plates with an absorbent material, and (d) initiating formation of the lead-acid battery plates while the plates contain more than about 5 wt. % free lead in the paste and are generally damp from moisture existing in the paste from the time of plate pasting. Although conventional curing and drying of the plates is obviated and the plate formation is initiated merely hours after plate pasting, instead of a day or more after plate pasting as is the case with conventional battery plate processing, the cells and batteries containing plates prepared in accordance with the present invention exhibit a mechanical strength and deliver an overall electrical performance equivalent or superior to cells and batteries containing conventionally prepared plates.

40 Claims, 2 Drawing Figures

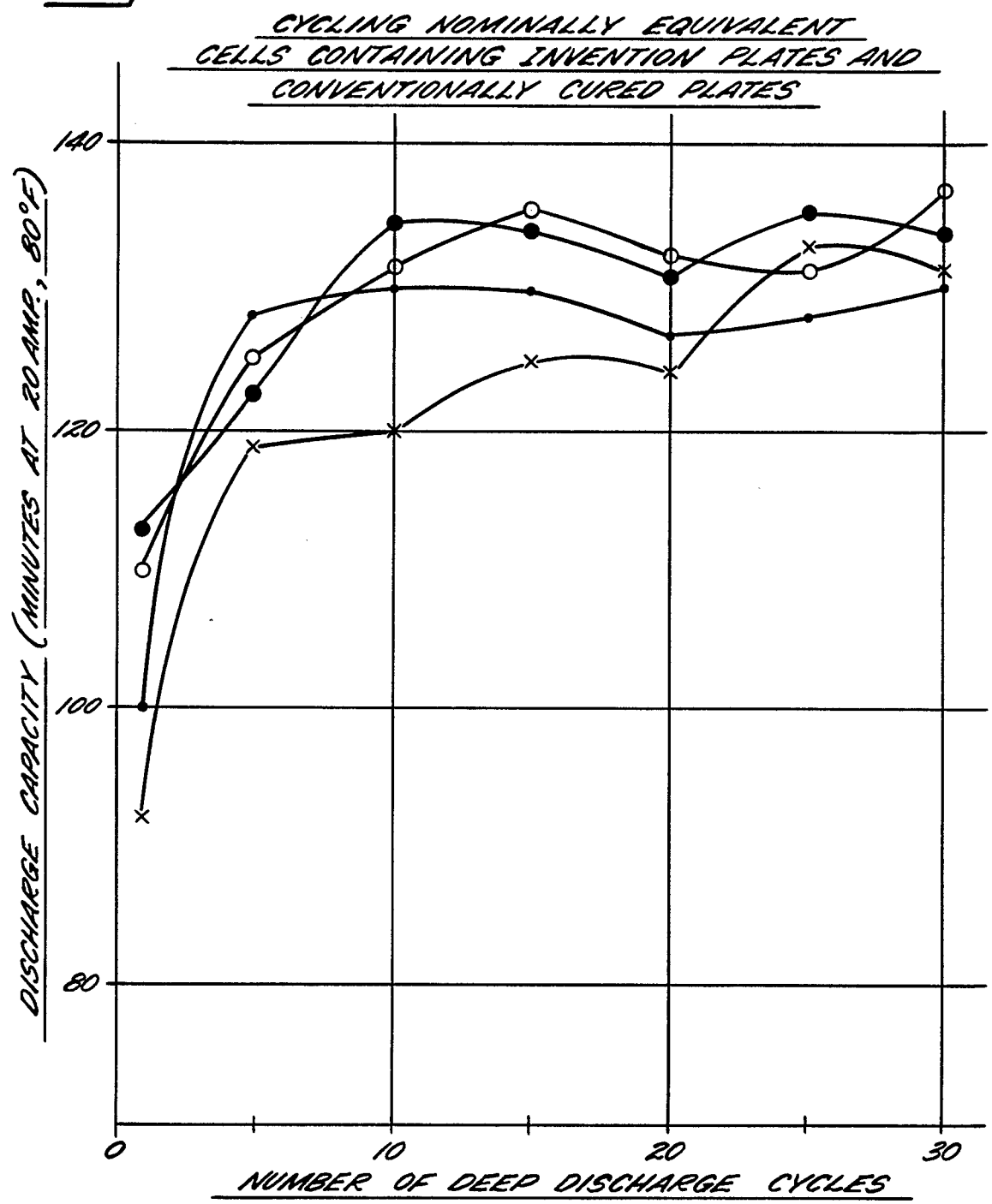

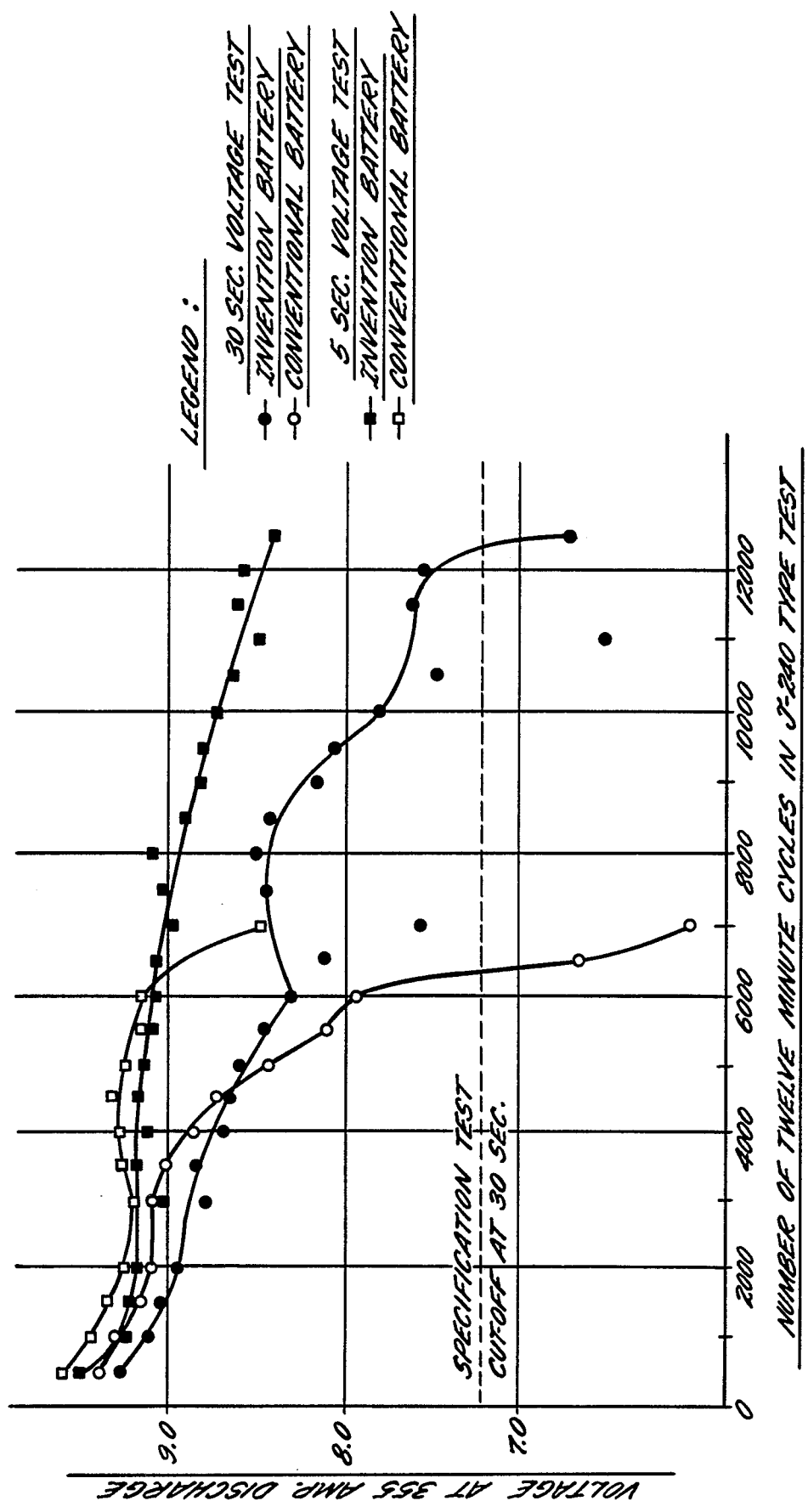

METHOD OF PREPARING LEAD-ACID BATTERY PLATES AND LEAD-ACID BATTERIES CONTAINING PLATES SO PREPARED

This invention relates to lead-acid batteries and, more particularly, to a method for efficiently and expeditiously preparing mechanically and electrically superior lead-acid battery plates for use in constructing lead-acid batteries and to batteries containing plates so prepared.

BACKGROUND OF THE INVENTION

The typical or conventional method of preparing lead-acid battery plates involves, in general, five steps. First, a battery grid of metallic lead, or more typically, a lead-based alloy, having the desired configuration is made by conventional techniques, such as direct casting or by mechanical working. Second, a leady oxide paste originating with a leady oxide containing, for example, 55-85 wt. % lead oxide and 45-15 wt. % metallic lead is applied to the battery grid, which acts as a support for the wet paste, to prepare the plate. The paste contains what may be considered as the active material precursors for the lead-acid battery. In addition, and as is known, the paste may contain a variety of auxiliary agents, such as, for example, expanders and the like. Third, the freshly pasted plates are briefly exposed to the elevated temperature of a flash drying oven or the like to effect a surface flash drying of the plates to prevent plate-to-plate sticking when the plates are stacked together as typically occurs in subsequent processing.

Fourth, the pasted plates, still internally wet, are cured and allowed to dry in a stacked condition under strictly controlled conditions. The method of plate curing most generally utilized is known as the "hydroset" process. As is fully explained by N. E. Hehner in Chapter 3 ("Curing of Freshly Pasted Plates") of the publication *Storage Battery Manufacturing Manual* (Independent Battery Manufacturers Association, Inc., Largo, Fla. (1970)), the hydroset process essentially consists of exposing the surface flash dried and stacked plates to temperatures in the range of about 16°-38° C. at relative humidities approaching about 100%. This curing and drying process generally takes about 48-72 hours to complete.

Several changes are generally believed to occur during curing. Oxidation of the residual metallic (free) lead in the paste takes place such that the final amount of free lead in the cured paste is about 3-5 wt. %. The plates dry out so that the final water content in the paste is less than about 1 wt. %. Corrosion processes occuring at the surface of the grid help the paste adhere thereto, and, most importantly, the microstructure of the active material precursor changes to yield a mechanically strong plate.

It is accordingly generally considered that high mechanical strength (i.e., high initial plate strength, high resistance to blistering and spalling during formation, and high resistance to shedding during service life) lead-acid battery plates can only be attained by the oxidation of the free lead in the paste prior to cell or battery formation.

It is further generally believed that the most rapid oxidation of the free lead in the paste prior to cell or battery formation takes place through the use of the aforementioned time-consuming and strictly controlled curing and drying process.

The mechanical strength of lead-acid battery plates is also believed to depend on the formation of basic lead sulfate compounds from lead oxide during the pasting step followed by the dehydration of these basic lead sulfate compounds during the curing and drying of the plates prior to cell or battery formation. Specifically, during the pasting process, only a small amount of the total free lead in the paste is converted into lead oxide while the existing lead oxide of the paste is primarily converted into hydrated tribasic lead sulfate. During the curing and drying of the plates, the hydrated basic lead compounds are converted to tribasic lead sulfate (and/or tetrabasic lead sulfate depending upon curing conditions) with a further conversion of any remaining free lead to lead oxide and elimination of water from the plates.

S. C. Barnes, M. E. D. Humphreys, and R. Taylor in the publication *The Curing of Lead-Acid Battery Plates* (International Power Sources Symposium, Brighton, England (1968), reprinted by Pergamon Press Ltd.) report upon their investigation of the plate curing process with the attendant reduction of the amount of free lead in the paste and the increase in mechanical strength of the plate and ways of accelerating it by means of closer control of the processing conditions. Their conclusion is that the highest rate of oxidation of the free lead occurs when the paste contains 7-8.5 wt. % water and is cured in an atmosphere maintained at 30° C. and 100% relative humidity. Such a strict control of the processing parameters, designed to ultimately dry out the paste and reduce the free lead content therein to approximately 4 wt. % prior to plate formation, however, is reported to merely reduce the curing and drying time from about 48-72 hours to about 24 hours or more to obtain a plate of equal mechanical strength.

After the plates have been cured and dried, the fifth and last plate preparation step is reached, namely the formation of the battery plates and the conditioning or cycling of the plates. Plates, as is well known, may be formed independently, assembled into cell elements and formed, or assembled into a completed battery and formed. Occasionally, to minimize the accumulation of the potentially hazardous lead dust in the air, the dry plates are wetted with water prior to any handling needed to prepare the plates for formation, e.g., prior to introduction into cell elements and insertion into battery containers.

Formation is usually carried out by passing current through the plates in the presence of a formation electrolyte. Most typically, either a one or two step formation is used, as is known. In the one step formation, the formation electrolyte has a relatively high specific gravity, e.g.—on the order of 1.200 or so. In the latter, the formation electrolyte has a relatively low specific gravity, e.g.—on the order of 1.060 or so. This formation electrolyte is then discarded, and a development electrolyte of higher specific gravity is added. In both cases, the specific gravities of the various electrolytes employed are selected to provide a full charge specific gravity for the electrolyte generally in the range of 1.230 to 1.290, a specific gravity of 1.265 being the typical target. The desired end result is a positive plate containing lead dioxide as the active material and a negative plate containing metallic lead as the active material.

BRIEF SUMMARY OF THE INVENTION

It is a principal object of the present invention to provide a more efficient and expeditious method for preparing lead-acid battery plates for use in constructing lead-acid batteries.

It is a further object of this invention to provide a means for employing continuous material flow processes in constructing cells and batteries, by eliminating the batch processing inherent when a conventional curing process is utilized.

Yet another object of the present invention is to eliminate or minimize the accumulation of lead dust in the air and consequently the need for costly ventilation and other precautionary equipment required for the abatement of the potentially hazardous lead dust which can result when handling conventionally cured and dried plates.

A still further object of this invention is to provide a method for preparing lead-acid battery plates which strengthens the plates, minimizes premature shedding of the plates, and provides a longer cycle life and, potentially, a longer service life for the battery.

Yet another object is to provide a lead-acid battery containing plates so prepared.

Other objects and advantages of the present invention will become apparent from the following detailed description.

The present invention is predicated in part on the discovery that the above-described conventional process of preparing lead-acid battery plates may be shortened and streamlined so as to provide a continuous flow process for preparing lead-acid battery plates. More specifically, the present invention involves the discovery that the above-described tedious and lengthy procedure of the conventional plate curing and drying process may be eliminated. After pasting and, if desired, surface flash drying in a drying oven, the plates, containing more than about 5 wt. % free lead in the paste and generally damp from moisture existing in the paste from the time of plate pasting, may be immediately formed independently or introduced into cell elements and into batteries, whereupon formation may be initiated. Plate formation, therefore, may be initiated merely hours after plate pasting, or even less, instead of a day or more as is the case with conventional battery plate processing involving the time-consuming curing and drying process previously described.

Cells and batteries containing plates prepared by this novel process have been tested and found to exhibit a mechanical strength and to deliver an overall electrical performance equivalent or superior to cells and batteries containing plates prepared by the less efficient and more time-consuming conventional battery plate process. Indeed, the batteries of the present invention exhibit unusually superior cycle life characteristics which should correlate with increased service life.

BRIEF DESCRIPTION OF THE DRAWINGS

FIG. 1 is a graph depicting a plot of deep discharge capacity versus number of deep discharge cycles for cells employing conventionally prepared plates and plates prepared in accordance with the present invention.

FIG. 2 is a graph depicting a plot of voltage at a 355A discharge versus number of 12-minute- cycles in a J-240 type test using 5 second and 30 second voltage tests for a conventionally prepared battery and a battery prepared in accordance with the present invention.

While the invention will be described in connection with a certain preferred embodiment, it will be understood that it is not intended to limit the invention to that particular embodiment. On the contrary, it is intended to cover all alternatives, modifications and equivalent arrangements as may be included within the spirit and scope of the invention as defined by the appended claims.

DETAILED DESCRIPTION OF THE INVENTION

The present inventive method for preparing lead-acid battery positive and negative plates for use in lead-acid batteries, comprises the following steps:
 (1) making the battery grids,
 (2) applying wet leady oxide paste to the grids to form plates,
 (3) optionally exposing the freshly pasted plates to conditions sufficient to effect a surface flash drying of the plates,
 (4) optionally wrapping the freshly pasted plates with an absorbent material, and
 (5) initiating formation of the lead-acid battery plates while the plates contain more than about 5 wt. % free lead in the paste.

In other words, formation is carried out without the aforementioned curing and drying steps having been effected, as is conventionally done.

The preparation of the battery grids and the application of paste to those grids to form plates can be conducted in any appropriate manner, e.g., by well-known conventional techniques. Likewise, the particular alloy used for the battery grids may be any of the several known, typically selected on the basis of cost and performance desired. Low antimony-lead alloys, optionally containing other alloying ingredients, may be suitably used. Where maintenance-free characteristics are desired, the grid alloys used will either be non-antimony alloys such as calcium-tin-lead or extremely low antimony-lead alloys (generally less than 2% by weight antimony), typically including other alloying ingredients. Suitable alloys of these types are well known. Similarly, a variety of paste formulations for lead-acid battery plates are known and may be employed. For example, the present invention can be used to prepare lead-acid battery plates with pastes containing leady oxides, e.g., Barton or Ball Mill leady oxides.

While the freshly pasted lead-acid battery plates prepared in accordance with the present invention need not be surface flash dried in a drying oven as in conventional plate processing, such surface flash drying will not adversely affect plates prepared in accordance with the present invention, except to the extent that it lengthens the overall plate preparation process. As previously discussed, surface flash drying of the plates generally is effected in conventional plate processing to prevent plate-to-plate sticking when the plates are stacked to cure and dry. Since such plate stacking normally does not take place in the present inventive process, there generally is no need to prevent plate-to-plate sticking and thus no need for surface flash drying. However, since the potential rates of plate pasting in accordance with the present invention are generally higher than the rates of "downstream" processing such as assembly and formation in existing plant facilities, extra plates may accumulate which may have to be stored in a stacked condition.

While the lead-acid battery plates need not be wrapped immediately after pasting or after the optional surface flash drying, the plates are preferably wrapped with an absorbent material so as to facilitate handling of the freshly pasted plates, to provide structural reinforcement for the plates, and to prevent plate-to-equipment sticking during processing and plate-to-plate sticking during any plate stacking which may take place due to slower "downstream" processing rates. This plate wrapping can be effected in a number of ways. For example, the individual plates can be U-wrapped with the absorbent material and then rolled through a compression wringer to ensure that the absorbent material adheres to the plates. Preferably, however, the absorbent material, is continuously fed at the pasting machine under plates whose bottom sides have been freshly pasted and likewise fed over such plates whose top sides have been freshly pasted. In this manner, the plates are quickly and easily wrapped. The freshly pasted plates will not stick to the processing equipment, e.g., conveyor belts, and if the individual plates are stacked after pasting for some reason, they will not stick together due to the absorbent material which will be between the stacked plates.

Any suitable material may be used to wrap the plates that does not adversely affect the operation of a battery constructed with such wrapped plates. Any material may thus be used which is porous or is rendered porous or disintegrates in the electrolyte utilized in the battery. Organic fiber including cellulose fiber, synthetic fiber, and glass fiber sheets can be satisfactorily used. Bleached paper, such as Bleached Battery Linen Tissue W/S, 8# basis weight, available from Chatfield Paper Co., Cincinnati, Ohio, of less than about 5 mils thickness is preferably used as the wrapping material. Such a bleached paper is preferred as the wrapping material since organic compounds in unbleached paper may leach out into the battery electrolyte which may adversely affect the performance of the battery. If desired, the wrapping material may be utilized in a manner so as to facilitate handling of the plates and/or to provide structural reinforcement for the plates. For example, a fibrous wrapping material could be enmeshed in the plate surface material paste to provide structural reinforcement for the plates. This can be accomplished in a variety of ways, including by way of the process disclosed in U.S. Pat. No. 4,429,442. Also, a suitable separator material could be utilized as the wrapping material, thereby eliminating a separate processing step for applying the separator material to the plates in constructing cell elements and batteries.

In the conventional plate preparation process, the freshly pasted plates would then be cured and dried in accordance with the tedious and time-consuming curing and drying procedure such as has been previously set forth in order to dry out the paste and reduce the free lead content therein to less than about 5 wt. %. In accordance with the present invention, however, the conventional curing and drying step is obviated. Thus, the pasted plates, whether or not flash dried or wrapped with some material as described herein, are formed while containing more than about 5 wt. % free lead in the paste. In addition, plate formation is generally initiated while the plates are still damp from moisture existing in the paste from the time of plate pasting. In other words, the plates are generally not allowed to dry out from the time of plate pasting through the time of plate formation.

As previously discussed and as is well known, plates may be formed independently, assembled into cell elements and formed, or assembled into a completed battery and formed. Formation may be carried out by any of the many conventional techniques known, including the one-step and two-step formation procedures presently utilized in the industry and previously referred to herein.

Regardless of the method of plate formation utilized, the separator material used in the cell elements may be any of the several suitable materials known for use in lead-acid batteries, e.g., commercially available "Daramic" polyethylene-silica (available from W. R. Grace & Co., Cambridge, Mass.), and of any suitable shape or design. The separators are preferably of an enveloped construction such that the plates can be inserted therein allowing for easier handling prior to introduction into cell elements and the battery casing. Sheet separators can also be utilized.

After the plates are assembled into cell elements, assembly of the battery may be completed by inserting the cell elements into the battery container and making the necessary electrical connections as is known.

Thus, regardless of the manner of plate formation utilized, plate formation can be initiated in a matter of hours after plate pasting, instead of the day or more required by conventional plate processing.

Of course, the positive and negative plates prepared in accordance with the present invention may either be exclusively used or used in combination with conventionally prepared plates in constructing a lead-acid cell or battery. If only some of the plates are to be prepared pursuant to the present invention, it will generally be preferred to process the positive plates in this fashion. As is known, the lack of satisfactory mechanical strength tends to be more of a problem with positive plates. Thus, the improved mechanical strength characteristics of plates processed in accordance with the present invention will accordingly be generally more useful with positive plates.

The positive and negative plates prepared in accordance with the present invention contain more than about 5 wt. %, e.g., about 16-18 wt. % free lead, as compared to about 3-5 wt. % in conventionally cured plates, at the time formation is initiated. This difference in free lead content at the time of initiation of plate formation is believed to have a desirable effect upon subsequent plate performance. While specific details and reasons for the improvement in plate performance are not certain, differences in crystallography are believed to play a major role. Thus, the properties of cells and batteries incorporating plates prepared by using the conventional curing and drying process, with the attendant drying out of the plates and reduction of the paste free lead content to less than about 5 wt. % prior to plate formation, contrasts significantly with the mechanical and electrical properties of cells and batteries using plates prepared in accordance with the present invention as the plates prepared in accordance with the present invention are mechanically and electrically superior to conventionally prepared plates.

In addition to providing a more efficient and expeditious means for preparing lead-acid battery plates than the conventional process and in addition to providing superior plates, the present inventive process moreover provides a means for employing continuous material flow processes in constructing cells and batteries, by eliminating the batch processing inherent in practicing the conventional curing and drying process.

Further, since the plates prepared in accordance with the present invention are generally damp when handled and used to construct cells and batteries, unlike conventionally prepared plates, the present inventive process can eliminate or minimize the accumulation of lead dust in the air and consequently the need for costly ventilation and other precautionary equipment required for the abatement of the potentially hazardous lead dust. More particularly, most of the lead dust present in the air in a battery factory is generated during the handling of dry plates, as occurs when stacking the plates for curing, and during subsequent assembly of the cell or battery prior to formation. Since the plates of the present invention are generally damp during handling, lead dust generation from the plates is minimal, if not nonexistent.

The batteries of the present invention, i.e., batteries incorporating plates prepared in accordance with the present invention, exhibit superior mechanical strength characteristics. Thus, the initial plate strength is superior, and resistance to blistering and spalling during formation are increased. The plates also exhibit increased resistance to shedding. The batteries tested likewise exhibit superior cycle life characteristics, which, although not tested to failure, translate into a longer service life. It is theorized that these advantages are achieved due to a unique crystal structure of the leady compounds as previously mentioned.

The following Examples further illustrate the present invention. These Examples should not be construed as in any way limiting the scope of the present invention.

EXAMPLE 1

This Example compares the mechanical strength of plates prepared in accordance with the present invention with that of conventionally prepared plates in a standard vibration test monitoring plate weight loss.

The tested plates consisted of standard automotive battery positive plates which were obtained at a commercial plant. The plates contained damp pastes (with about 12 wt. % water) of Barton leady oxides, which were pasted to grids made from a 4.5 wt. % antimony-lead alloy, with the grid having a nominal cross-section of 0.064 inch. The area dimensions of the plate were 5.68 inches (length) by 4.85 inches (height).

One set of plates was conventionally cured and dried by passing them through a flash drying oven and then curing and drying them in stacks at ambient temperature and about 70–80% relative humidity for about 72 hours, at the end of which time the plates were used to construct cells.

A second set of plates was removed from the pasting line immediately after pasting without passage through the flash drying oven. This second set of plates was then U-wrapped with Bleached Battery Linen Tissue W/S, 8# basis weight, (available from Chatfield Paper Co., Cincinnati, Ohio) and rolled through a compression wringer to ensure that the tissue paper adhered to the plates. The plates were then used to construct cells without any substantial lapse of time after pasting.

Specifically, both sets of positive plates were introduced into enveloped 0.052 inch microporous commercially available "Daramic" polyethylene-silica separators (available from W. R. Grace & Co., Cambridge, Mass.), and 11-plate cell elements (containing 5 positive plates and 6 negative plates) were constructed using negative plates of 0.050 inch cross-section which were conventionally cured and dried in a manner identical to that described above in connection with the conventionally cured positive plates.

Cells were constructed from S.A.E./B.C.I. Group 24 polypropylene case compartments and formation for both sets of cells was carried out using a conventional two-step formation, the formation electrolyte being an aqueous sulfuric acid solution having a 1.060 specific gravity. The formation acid was introduced into the cells containing the positive plates prepared in accordance with the present invention within two hours of the positive plate pasting, as compared to over 72 hours for the cells containing the conventionally cured positive plates.

Suitable development electrolyte was then employed to provide a full charge specific gravity of 1.265.

The formed positive plates of the present invention had only a 3.5% weight loss after 4 minutes in a standard vibration test which yielded a 21% weight loss for matching positive plates prepared by the conventional curing procedure.

This Example illustrates that the mechanical strength of plates prepared in accordance with the present invention is superior to that of conventionally prepared plates.

EXAMPLE 2

This Example compares the electrical performance, specifically the capacity-cycle number relationship, of lead-acid cells containing plates prepared in accordance with the present invention with that of lead-acid cells containing conventionally prepared plates.

Four different cells were tested in this Example. Cell Type I utilized both positive and negative plates prepared in accordance with the present invention. Cell Type II utilized positive plates prepared in accordance with the present invention and negative plates conventionally prepared. Cell Type III utilized positive plates conventionally prepared and negative plates prepared in accordance with the present invention. Cell Type IV utilized both positive and negative plates conventionally prepared.

The compositions and dimensions of the grids and plates were the same as those recited for the grids and plates of Example 1.

Table I below sets forth the average weights of the plates and grids utilized in the cells tested:

TABLE I

|  | Ave. Plate Wt. | Ave. Grid Wt. |
|---|---|---|
| Cell Type I | | |
| Positive* | 160 g (146 g) | 55.4 g |
| Negative* | 133 g (124 g) | 47.9 g |
| Cell Type II | | |
| Positive* | 160 g (146 g) | 56.0 g |
| Negative | 127 g | 47.0 g |
| Cell Type III | | |
| Positive | 149 g | 60.0 g |
| Negative* | 134 g (125 g) | 47.9 g |
| Cell Type IV | | |
| Positive | 150 g | 63.0 g |
| Negative | 127 g | 47.0 g |

The asterisks in Table I indicate those plates that were prepared in accordance with the present invention. Since the plates of the present invention are wrapped and introduced into cell elements shortly after pasting, these plates had to be weighed while still damp.

Damp positive and negative plates generally contain about 13 wt. % and 11 wt. % water, respectively, in the paste. Estimated dry weight values for the plates of the present invention based upon these average water contents of the pastes are recited in parentheses in the above Table.

The conventionally prepared plates were initially passed through a flash drying oven after pasting and were then cured and dried in stacks at ambient temperature and about 70-80% relative humidity for about 72 hours, at the end of which time the plates were used to construct cells.

The plates of the present invention were removed from the pasting line immediately after pasting without passage through the flash drying oven. These plates were then U-wrapped with the bleached battery linen tissue described in Example 1 and rolled through a compression wringer to ensure that the tissue paper adhered to the plates. The plates were then used to construct cells without any substantial lapse of time after pasting.

Specifically, the positive plates of the present invention and those conventionally prepared were introduced into the enveloped 0.052 inch microporous polyethylene-silica separators previously described in Example 1, and 11-plate cell elements (containing 5 positive plates and 6 negative plates) were constructed using the appropriate negative plates, i.e., those of the present invention or those conventionally prepared depending upon the cell type involved.

All of the cells were constructed from S.A.E./B.C.I. Group 24 polypropylene case compartments, and the formation was carried out as described in Example 1. The formation acid was introduced into the cells within two hours of the pasting of the plates of the present invention, as compared to over 72 hours of the pasting of the conventionally prepared plates.

The cells were deep discharged at a two hour rate (20 amperes) in a cycling regime to determine the relative capacities of the four types of cells. A plot of deep discharge capacity versus number of deep discharge cycles is presented in FIG. 1. The capacity-cycle number relationship of the four types of cells demonstrates that cells containing plates prepared in accordance with the present invention behave essentially the same as cells constructed using conventionally prepared plates.

EXAMPLE 3

This Example compares the electrical performance, specifically the reserve capacity and cold cranking characteristics upon initial cycling, of lead-acid batteries containing plates prepared in accordance with the present invention with that of lead-acid batteries containing conventionally prepared plates.

A full size, 6-cell, nominal 12V, S.A.E./B.C.I. Group 22 lead-acid battery was constructed using plates prepared in accordance with the present invention. A second full size matching battery was constructed with the identical dimensions and specifications of the first battery except that conventionally cured and dried plates were utilized.

The compositions of the grids and plates were the same as those recited for the grids and plates of Example 1. The positive and negative grid structures were 0.075 inches and 0.045 inches in cross-section, respectively. The area dimensions of the plates were 5.68 inches (length) by 4.30 inches (height).

Table II sets forth the average weights of the plates and grids utilized in the two batteries tested:

TABLE II

|  | Ave. Plate Wt. | Ave. Grid Wt. |
| --- | --- | --- |
| Invention Constructed Battery |  |  |
| Positive | 162 g (148 g) | 54.5 g |
| Negative | 115 g (106 g) | 37.0 g |
| Conventionally Constructed Battery |  |  |
| Positive | 155 g | 54.5 g |
| Negative | 101 g | 37.0 g |

As before, the plates prepared in accordance with the present invention were weighed while still damp. Estimated dry weight values for the plates of the present invention based upon the average water contents of the pastes are recited in parentheses in the above Table (assuming the water contents described in Example 2).

The positive and negative plates of the present invention and those conventionally prepared were prepared in the same manner discussed in Example 2.

The positive plates of the present invention and those conventionally prepared were introduced into the enveloped 0.037 inch microporous polyethylenesilica separators previously described and respectively combined with negative plates of the present invention and conventionally prepared negative plates to form 11-plate cell elements (containing 5 positive plates and 6 negative plates).

The 6-cell invention and conventional batteries were constructed in S.A.E./B.C.I. Group 22 polyolefin cases, and the formation was carried out as described in Example 1. The formation acid was introduced into the cells containing the positive and negative plates of the present invention within three hours of plate pasting, as compared to over 72 hours for the cells containing the conventionally prepared positive and negative plates.

At the time of the formation acid addition, the active material or paste of the positive and negative plates of the present invention contained 17.9 wt. % and 16.4 wt. % free lead, respectively. The quantities of free lead in the conventionally prepared plates ranged from 3 wt. % to 5 wt. %. This difference in free lead content at the time of initiation of plate formation is believed to have a desirable effect upon subsequent plate performance. While specific details and reasons for the improvement in plate performance are not certain, differences in crystallography are believed to play a major role.

The formed plates of the invention battery exhibited slight signs of blistering; however, it is believed that modification of the current (ampere) program during formation and/or changes in the leady content of the starting oxides could diminish or eliminate this effect.

Table III sets forth reserve capacity and cold cranking characteristics upon initial cycle conditioning which the batteries tested exhibited:

TABLE III

|  | Invention Battery | Conventional Battery |
| --- | --- | --- |
| 1st Reserve Capacity (80° F., 25 A discharge) | 81 min. | 88 min. |
| 1st Cold Cranking (0° F., 355 A, 30 sec.) | 7.02 V 11.7 MΩ | 7.42 V 11.1 MΩ |
| 2nd Reserve Capacity (80° F., 25 A discharge) | 92 min. | 85 min. |
| 2nd Cold Cranking (0° F., 355 A, 30 sec.) | 7.23 V 11.4 MΩ | 7.41 V 10.9 MΩ |
| 3rd Reserve Capacity | 84 min. | 96 min. |

TABLE III-continued

|  | Invention Battery | Conventional Battery |
|---|---|---|
| (80° F., 25 A discharge) | | |
| 3rd Cold Cranking | 7.45 V | 7.50 V |
| (0° F., 355 A, 30 sec.) | 10.6 MΩ | 10.7 MΩ |

As the above data shows, the invention battery gave a performance which was intially below that of the conventional battery, but, after cycle conditioning, the two batteries gave what is considered to be an equivalent performance.

EXAMPLE 4

This Example compares the cycling durability of lead-acid batteries containing plates prepared in accordance with the present invention with that of lead-acid batteries containing conventionally prepared plates.

The invention and conventional batteries of Example 3 were subjected to a 12-minute S.A.E./B.C.I. J-240 type cycling (life) test. The test cycle was performed as follows. The batteries were discharged for 2 minutes ±1 second at 25A ±0.10A and charged at a maximum voltage of 14.8V ±0.03V and at a maximum rate of 25A ±0.10A for 10 minutes ±3 seconds. The batteries were tested at 105° F.±5° F. using the generally recommended S.A.E./B.C.I. type practices.

A plot of voltage at a 355A discharge versus number of 12-minute cycles in the J-240 type test using 5 second and 30 second voltage tests is presented in FIG. 2. The invention battery achieved 12,500 qualifying J-240 12-minute cycles, whereas the conventional battery only achieved 6,500 qualifying cycles.

This Example illustrates that the durability of the lead-acid batteries containing plates prepared in accordance with the present invention is superior to that of lead-acid batteries containing conventionally prepared plates.

Thus, as has been seen, the present invention provides a process considerably more expeditious than is conventionally employed in making lead-acid batteries. By eliminating the time-consuming curing and drying steps which inherently results in a batch-type process, the process of this invention not only allows for a continuous-type production scheme, but also can minimize, if not eliminate, the lead dust problems resulting from conventional processing. Moreover, and unexpectedly, the resulting batteries utilizing plates prepared in accordance with the present invention appear to exhibit enhanced mechanical strength and longer cycle life performance.

We claim:

1. A method for preparing lead-acid battery positive and negative plates for use in lead-acid batteries, comprising: (a) providing battery grids, (b) applying wet leady oxide paste to the grids to form plates, and (c) initiating formation of the lead-acid battery plates while the plates contain more than about 5 wt. % free lead in the paste.

2. The method of claim 1, wherein the plates are assembled into cell elements and inserted into a battery container prior to plate formation.

3. The method of claim 2, wherein the plates are wrapped with an absorbent material prior to being assembled into cell elements.

4. The method of claim 3, wherein the absorbent material affords a plate surface drying action sufficient to prevent sticking between plates and between plates and other surfaces.

5. The method of claim 4, wherein the absorbent material comprises a material selected from the group consisting of organic fiber, synthetic fiber, and glass fiber.

6. The method of claim 5, wherein the absorbent material comprises bleached paper.

7. The method of claim 3, wherein the absorbent material comprises a material and is constructed in a manner so as to facilitate handling of the plates and to provide structural reinforcement for the plates.

8. The method of claim 3, wherein the absorbent material comprises a separator material.

9. The method of claim 3, wherein the plates are inserted into enveloped separators before assembly into cell elements.

10. The method of claim 9, wherein the separators comprise polyethylene-silica material.

11. The method of claim 2, wherein the paste initially comprises Barton or Ball Mill leady oxides.

12. The method of claim 3, wherein the plates are exposed to a flash drying oven prior to being wrapped with the absorbent material.

13. The method of claim 2, wherein the plates are exposed to a flash drying oven prior to being assembled into cell elements.

14. The method of claim 2, wherein plate formation is initiated while the plates are damp from moisture existing in the paste from the time of plate pasting.

15. The method of claim 2, wherein the paste contains at least about 16 wt. % free lead at the time plate formation is initiated.

16. The method of claim 2, wherein the paste contains up to about 45 wt. % free lead at the time plate formation is initiated.

17. The method of claim 2, wherein the paste contains up to about 18 wt. % free lead at the time plate formation is initiated.

18. The method of claim 2, wherein plate formation is initiated within about three hours after plate pasting.

19. A lead-acid battery containing plates prepared by the method comprising: (a) providing battery grids, (b) applying wet leady oxide paste to the grids to form plates, and (c) initiating formation of the lead-acid battery plates while the plates contain more than about 5 wt. % free lead in the paste.

20. The battery of claim 19, wherein the plates are assembled into cell elements and inserted into a battery container prior to plate formation.

21. The battery of claim 20, wherein one or more of the plates are conventionally cured and dried before assembly into cell elements.

22. The battery of claim 20, wherein the plates are wrapped with an absorbent material prior to being assembled into cell elements.

23. The battery of claim 22, wherein the absorbent material comprises a material selected from the group consisting of organic fiber, synthetic fiber, and glass fiber.

24. The battery of claim 23, wherein the absorbent material comprises bleached paper.

25. The battery of claim 22, wherein the absorbent material comprises a material and is constructed in a manner so as to facilitate handling of the plates and to provide structural reinforcement for the plates.

26. The battery of claim 22, wherein the absorbent material comprises a separator material.

27. The battery of claim 22, wherein the plates are inserted into enveloped separators before assembly into cell elements.

28. The battery of claim 27, wherein the separators comprise polyethylene-silica material.

29. The battery of claim 22, wherein the paste initially comprises Barton or Ball Mill leady oxides.

30. The battery of claim 22, wherein the freshly pasted plates are exposed to a flash drying oven prior to being wrapped with the absorbent material.

31. The battery of claim 19, wherein the freshly pasted plates are exposed to a flash drying oven prior to being assembled into cell elements.

32. The battery of claim 20, wherein plate formation is initiated while the plates are damp from moisture existing in the paste from the time of plate pasting.

33. The battery of claim 20, wherein the paste contains at least about 16 wt. % free lead at the time plate formation is initiated.

34. The battery of claim 20, wherein the paste contains up to about 45 wt. % free lead at the time plate formation is initiated.

35. The battery of claim 20, wherein the paste contains up to about 18 wt. % free lead at the time plate formation is initiated 36. The battery of claim 20, wherein plate formation is initiated within about three hours after plate pasting.

37. A lead-acid battery containing pasted plates, the formation of said plates having been initiated while the plates contained more than about 5 wt. % free lead in the paste.

38. The battery of claim 37, wherein at the time of plate formation the plates were damp from moisture existing in the paste from the time of plate pasting.

39. The battery of claim 38, wherein an absorbent material surrounds the pasted plates.

40. The battery of claim 39, wherein enveloped separators surround the absorbent material wrapped plates.

* * * * *